United States Patent Office 3,783,104
Patented Jan. 1, 1974

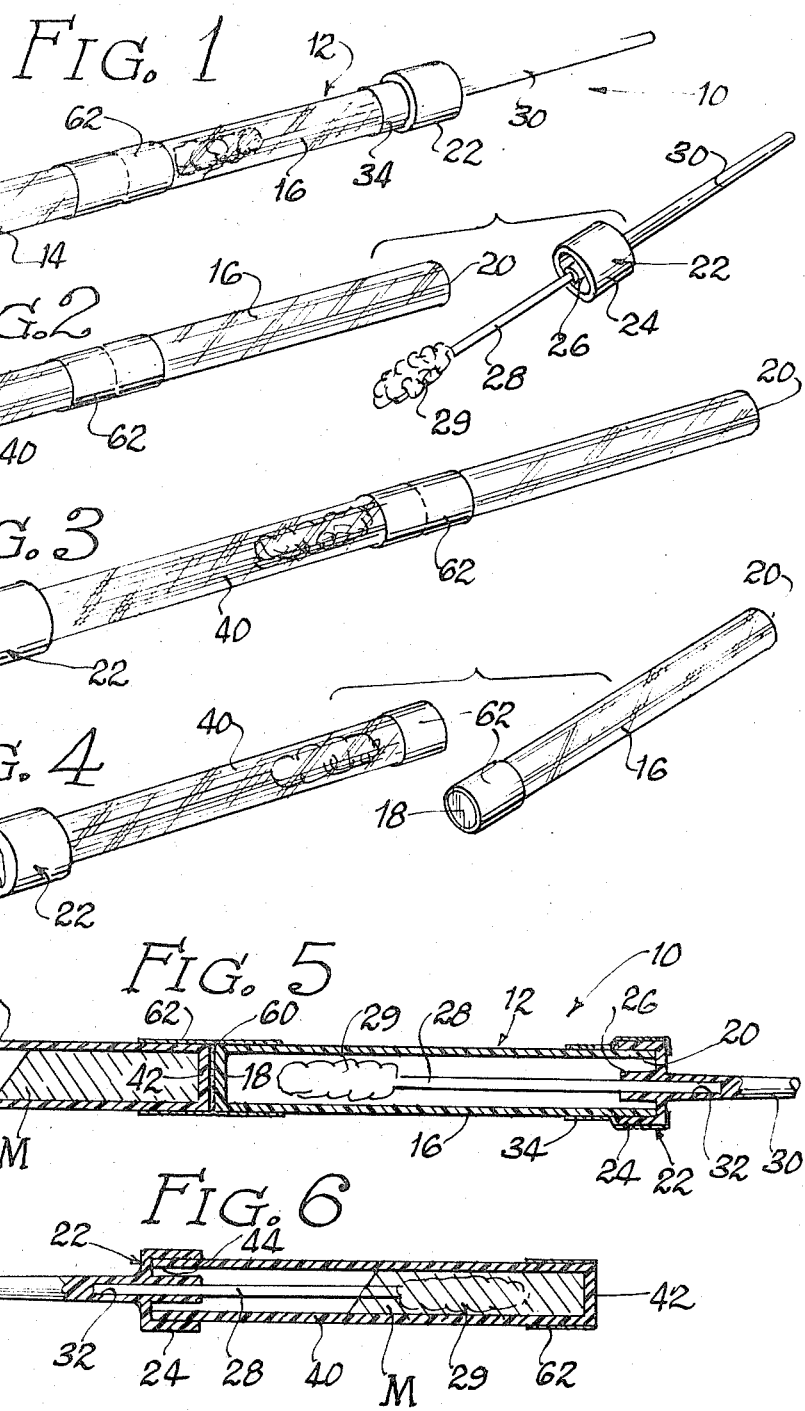

3,783,104
TESTING AND CULTURING TRANSPORT SYSTEM AND METHOD OF MAKING SAME
Jack R. Henshilwood, Highland, Ind., and Francois J. Soiret, Madison, Ill., assignors to Wilson Pharmaceutical & Chemical Corporation
Filed Nov. 12, 1971, Ser. No. 198,155
Int. Cl. C12b 1/00
U.S. Cl. 195—104
10 Claims

ABSTRACT OF THE DISCLOSURE

A swabbing and culturing assembly having a pair of coaxial, releasably connected tubes connected to each other at their closed ends, as by adhesive or a shrink band or the like. One tube is closed by a cap mounting a swab. The other tube contains a culturing substance and is closed by a cap. The swab mounting cap is adapted to sealingly close each open end so that after the swab has collected a specimen, the swab may be sealed into the culture tube. The adhesive bond and shrink band are easily severable so that the tubes may be separated, to make the culture tube more compact for shipment to a laboratory. The tubes may be individually made and sterilized appropriately, as by gas or heat, after which the tubes are assembled in a closely adjacent end-to-end relation.

---

This invention relates to a testing system for use in collecting, culturing and transporting microorganisms, such as bacteria, and to a method of making such a system. More particularly, it relates to an easily used swabbing unit for collecting a culture from a selected area of a body and for maintaining the culture in a viable condition, for example, during shipment to a test center for subsequent testing and identification. The testing and culturing transport system of this invention provides both a sterile culturing medium and a sterile swabbing member in connected severable compartments. The swabbing member may be removed for use from its compartment, and after use it may be easily sealed in the compartment carrying the culturing medium. The compartments may then be separated, the compartment in which the swabbing member was contained being disposed of, and the remaining compartment with the swabbing member in the culture medium may be easily transported to a test center.

A variety of culturing transport systems have been suggested for use in the past. One such device which is illustrated in U.S. Pat. No. 3,450,129, comprises a tube made of compressible material. The tube carries a frangible ampoule filled with liquid which is held in the tube bottom, as by a cotton plug. The cotton plug is held in place as by the tip of a swab. After the swab has been used to collect a culture, it is returned to the tube, the tube is squeezed to rupture the ampoule, and the culturing medium in the ruptured ampoule moistens the swab. The tube is closed for shipment, as to a testing laboratory. In such devices, among other things, broken glass may be introduced into the swab head and the system is complicated to manufacture and assemble.

Another type of transport system is illustrated in U.S. Pat. No. 3,163,160. In that patent, separate compartments are provided for a swab and a culture medium. The culture medium is isolated in a lower compartment, as by a self-sealing rubber valve. The lower compartment of such a system must be flexible and permanently deformable. As such, it must be protected prior to use or else the swab may come into contact with the culture medium prior to the time the swab has been used to collect a specimen. Such a construction requires a number of separate parts of various materials, and must be provided with a rigid guard to prevent accidental flexing or deformation of the walls of the lower compartment which would otherwise immerse the swab and render the device unusable.

Others have suggested the manufacture of specially configured culture tubes which are formed to provide a plurality of interior compartments, such as two compartments themselves, must be sterilized. The manufacture of such a system frequently requires the use of gas sterilization procedures entirely, because it is not possible to autoclave or heat sterilize all of the components of the system.

In accordance with this invention, a testing and culturing transport system eliminating the foregoing problems is provided. The system is easily and inexpensively made and assembled and with components that may be interchangeably secured to each other, for example as the culturing medium used may vary.

A testing and culturing transport device of this invention comprises a pair of separate elongate tubes secured to each other in end-to-end relation. Each of the tubes defines a closed end and an open end. The closed ends are disposed in a closely adjacent or abutting end-to-end relation, and are releasably secured in that end-to-end relation. One of the tubes contains a culture medium and mounts closure means sealingly closing the open end. The other tube mounts a swab member and a closure means for sealingly closing the open end of that tube. The tubes may each be separately assembled and sterilized in accordance with the most expeditious and efficient mode of sterilization, after which they are ready to be secured to each other in the abutting end-to-end relation.

The closed ends of the tubes are preferably flat, and are secured, as by an adhesive interposed between them and by a shrink seal which encircles portions of each of the tubes adjacent their closed ends. Although the adhesive and the shrink seal securely connect the tubes in their generally coaxial relationship, the tubes are easily separated from each other when that is desired, as, for example, after a specimen has been collected on the swab and the tube containing the microorganism introduced into the culture medium by the swab is to be transported, as to a test center for identification. The open ends of the tubes are preferably substantially identical in configuration so that the closure means mounting the swab may be removed from the first tube and then, after use, the closure means may be sealingly secured to the open end of the tube containing the culture medium.

Further objects, features and advantages of this invention will become apparent from the following description and appended drawings, of which:

FIG. 1 is a perspective view of a testing and culturing transport system of this invention;

FIG. 2 is an exploded perspective view of the system of FIG. 1;

FIG. 3 is a view similar to FIG. 2, with a closure and swab assembly inserted in a culturing tube;

FIG. 4 is a view similar to FIG. 3 showing the tubes separated from each other;

FIG. 5 is a longitudinal cross-sectional view of the system of FIG. 1; and

FIG. 6 is a longitudinal cross-sectional view of FIG. 4.

Referring now to the drawings, a testing and culturing transport system 10 of this invention comprises a first tube assembly 12 and a coaxial adjacent second tube assembly 14. Tube assembly 12 comprises an elongate cylindrical tube 16 which may be made of any suitable material, such as of glass or of a transparent plastic. A suitable transparent plastic is a polycarbonate sold under the trade name Lexan by the General Electric Company. Tube 16 is provided with a generally flat closed or bottom end 18 and an open end 20.

The open end 20 is proportioned to cooperate with a suitably configured closure means, such as a cap 22. Cap 22 comprises a cylindrical section 24 which is configured to sealingly embrace an upper portion of the tube wall adjacent open end 20. That is best illustrated in FIG. 5. Cap 22 defines a central boss 26 suitably apertured to receive the upper end of a swab member 28. The other end of swab member 28 is wrapped with a suitable swab material 29, such as calcium alginate. To minimize the length of tube 16, a relatively short swab member 28 is provided, but additional effective length is provided by a cap extension 30 formed integrally with cap 22. To make certain that the cap 22 and swab member 28 are fixedly secured to each other, as illustrated in FIG. 5, a cylindrical opening 32 molded in cap 22 may be provided to receive the end of swab member 28.

Tube assembly 12 is adapted to be gas sterilized. After sterilization, cap 22 is sealingly secured in place and is secured by a tamperproof seal 34. Seal 34 may desirably be a heat-shrinkable band positioned to encircle the cap section 24 and an upper peripheral edge of cap 22, as well as a portion of the wall of tube 16 adjacent cap 22, all as is illustrate din FIGS. 1 and 5. If it is not disturbed, as by removal, cutting, or the like, tamperproof seal 34 serves to assure a user of the system that the tube assembly 12 remains in the condition in which it was shipped, i.e., remains in its sterile condition, and that it may therefore be used with confidence.

Tube assembly 14 comprises a generally cylindrical elongate tube 40 having a closed end comprising a generally flat bottom 42. The other end of tube 40 is open, as indicated at 44, and is proportioned to mount a complementarily configured closure means, such as cap 46. Cap 46 may be essentially identical to cap 22, except that it does not provide an extension 30. The cylindrical section of cap 46 is adapted to sealingly engage and embrace an outer surface of the portion of the tube wall adjacent open end 44.

Tube 44 is partially filled with a transport medium, in this case illustrated as being a generally "solid" slant medium M. Tube 40 may be of any suitable material, such as of a transparent Lexan or glass. It is appropriately filled with a predetermined amount of a desired transport medium M, such as a solid slant, is then fitted with cap 46, is sealed with a tamperproof seal member 48, like tamperproof seal 34, and is then sterilized, as by autoclaving it at a suitable elevated temperature and pressure, such as at about 120° C. and 15 p.s.i.g. for about 30 minutes.

When a testing and culturing transport system 10 of this invention is to be assembled for shipment to a user, appropriate tube assemblies 12 and 14 are made as described (or selected from storage, and are releasably secured to each other in coaxial and abutting end-to-end relation.

A preferred method for releasably securing tube assemblies 12 and 14 to each other comprises the placement of a layer of suitable adhesive 60 between the closely adjacent or abutting tube ends, i.e., between flat bottom ends 18 and 42 (as best seen in FIG. 5) to adhere the tube assemblies to each other and the utilization of a shrunk seal mechanically to fix that relationship. A shrunk seal 62 is provided by utilizing a band of shrinkable material, as a heat-shrinkable material, such as seamless polyvinyl chloride tubing which is shrinkable at temperature less than 200° F. in about three (3) seconds, and which is of a length sufficient to encircle portions of the tubes 16 and 40 adjacent their closed bottom ends 18 and 42. The band of heat-shrinkable material is located as generally illustrated in FIG. 5, and is then heat shrunk in a known manner into the tight gripping relationship illustrated in FIG. 5. The combination of the adhesive layer 60 and the seal 62 serve releasably to secure the tubes together in their closely adjacent end-to-end relation for shipment to a user.

When a testing and culturing transport system of FIG. 1 is to be used, as by a doctor, the tamperproof seal 34 is broken and the cap with the swab member 28 is removed, as illustrated by FIG. 2. A specimen is then procured with the swab member 28 by contacting the swab material 29 with the body area from which the specimen is to be taken. Although its use is not so limited, a testing and culturing transport system constructed in accordance with the preferred embodiment illustrated in the drawings is most effectively used to procure rectal and vaginal specimens.

After the specimen has been procured, the cap 46 is removed (after breaking the tamperproof seal 48), and the swab material 29 is inserted into the medium M, and the cap 22 is sealingly mounted at the open end 44 of tube 40, as was the cap 46. Thereafter, the tube 16 may be separated from the system 10, as by cutting or otherwise destroying the integrity of the shrunk seal 62 and by breaking the bond provided by adhesive layer 60.

The ready securance and separation of a pair of tube assemblies for the purposes stated is most efficiency accomplished in the manner described. However, substantially all of the advantages of the invention may be obtained when round bottom tubes, rather than flat bottom tubes, are adhesively and/or clampingly (as by a shrunk seal) engaged. Further suitable resilient elastic bands may be substituted for a shrunk seal for clamping holding the tube ends in their relationship of close adjacency.

Testing and culturing transport systems made in accordance with this invention are inexpensively and efficiently manufactured and used. Separate tube assemblies, one housing a swab member and the other containing a culture medium, may be manufactured and may be individually sterilized in the most efficient and least expensive manner. An appropriate swabbing tube assembly may then be associated with an appropriate culturing assembly, depending upon the test procedure with which the system is to be used. For example, a tube assembly incorporating a solid slant medium M may be made and other tube assemblies incorporating suitable liquid mediums may be made. Indeed, different swabbing tube assemblies may also be made if desired. When a testing and culturing transport system is to be made up for shipment, an appropriate swabbing tube assembly may be then releasably secured to a complementary medium containing assembly, as in the manner described above for shipment for ultimate use, as by doctors or other medical personnel.

The tubes themselves may be of conventional materials and of conventional shapes, requiring the use of no special molding techniques and no difficultly molded or formed sections or portions. The same is true of the closures or caps. After use, the swab containing tube assembly may be easily removed and thrown away, unlike, for example, systems in which a specially formed tube defining several compartments is used. No crushed pieces of glass or the like are introduced into the medium to interfere with subsequent test procedures, and no special rubber or flexible parts or protective wall members are required.

It will be apparent from the foregoing description of a presently preferred embodiment that modifications may be made in the method and system described without departing from the spirit and scope of this invention.

What is claimed is:

1. A testing and culturing transport system comprising a first elongate tube defining a closed end and an open end, a second separate elongate tube defining a closed end and an open end, said tubes being coaxially disposed with their closed ends in a closely adjacent end-to-end relation, means releasably securing said closed ends in said closely adjacent end-to-end relation, said first tube containing a culture medium and mounting closure means sealingly closing said first open end, and said second tube mounting a second closure means sealingly closing said second open end, and a swab member within said second tube and secured to said second closure means, said second closure means being adapted to be sealingly positioned on the open end of said first tube so that the swab member is in contact with said culture medium subsequent to collecting a specimen on said swab.

2. A testing and culturing transport system in accordance with claim 1 wherein said open ends are substantially identical in configuration and said second closure means is proportioned interchangeably to sealingly close each of said open ends.

3. A testing and culturing transport system in accordance with claim 2, wherein said securing means comprises a shrunk seal encircling portions of said first and second tubes adjacent their closed ends.

4. A testing and culturing transport system in accordance with claim 2, wherein said securing means comprises adhesive material disposed between said closed ends.

5. A testing and culturing transport system in accordance with claim 2 wherein said closed ends are flat and wherein said securing means comprises a shrunk seal encircling portions of said first and second tubes adjacent their closed ends.

6. A testing and culturing transport system in accordance with claim 5 wherein said securing means further comprises adhesive material disposed between said closed ends.

7. A method of assembling a swabbing and culturing transport system comprises the steps of filling a first elongate tube having a closed end and an open end with a predetermined quantity of a culture medium and sealing the open end with a first closure means and sterilizing the same, providing a second separate elongate tube having a closed end and an open end with a second closure means mounting a swab member and sealing the open end with said second closure means and sterilizing the same, disposing the tubes in coaxial and closely adjacent end-to-end relation, and releasably securing said tubes together at their closely adjacent ends, and wherein said tubes are formed with open ends which are sufficiently identical in configuration whereby when said second closure means is removed from said second tube and the swab member is used to collect a specimen, said second closure means may be sealingly positioned on the open end of said first tube so that said swab member is in contact with said culture medium.

8. The method of claim 7, wherein said securing step comprises positioning said closed ends of said tubes in close adjacency.

9. The method of calim 7, wherein said securing step comprises encircling the closed ends with a shrinkable band of material and then shrinking the band into firm engagement with wall portions of said tubes adjacent said closely adjacent closed ends.

10. The method of claim 7, wherein one of said tubes is heat sterilized and the other is gas sterilized.

References Cited
UNITED STATES PATENTS 3,163,160  12/1964  Cohen _____ 195—139

OTHER REFERENCES

B & D Laboratories Catalogue; 1964.
Martin Frobisher: Fundamentals of Microbiology; W. B. Saunders Co., 8th ed.; p. 195; 1970.

A. LOUIS MONACELL, Primary Examiner

R. J. WARDEN, Assistant Examiner

U.S. Cl. X.R.
128—2 W; 195—139